United States Patent

[11] 3,598,274

| [72] | Inventor | Paul V. Snyder |
| | | Whitehall, Pa. |
| [21] | Appl. No. | 844,938 |
| [22] | Filed | July 25, 1969 |
| [45] | Patented | Aug. 10, 1971 |
| [73] | Assignee | General Electric Company |

[54] ELECTRIC TOASTER CONSTRUCTION
4 Claims, 4 Drawing Figs.

[52] U.S. Cl. ................................................. 220/4 R, 99/385
[51] Int. Cl. ..................................................... B65d 7/30, A47j 37/08
[50] Field of Search............................................ 220/4, 84, 4 R; 99/385, 391, 400, 401

[56] References Cited
UNITED STATES PATENTS

| 2,309,641 | 2/1943 | Goush | 99/401 X |
| 2,457,023 | 12/1948 | Zelt | 220/U-SHAPED |
| 3,169,469 | 2/1965 | Parr | 99/401 X |
| 3,334,576 | 8/1967 | Bufkin | 99/385 |

FOREIGN PATENTS

| 1,470,227 | 1/1967 | France | 220/4 |

Primary Examiner—George E. Lowrance
Attorneys—Lawrence R. Kempton, Leonard J. Platt, John E. Cullen, Frank L. Neuhauser, Oscar B. Waddell and Joseph B. Forman ABSTRACT: An electric toaster construction wherein a one-piece toaster shell includes top and sidewalls and also includes uniquely formed flanges for securely holding separate front and rear panels.

PATENTED AUG 10 1971 3,598,274

Inventor:
Paul V. Snyder,
by Leonard J. Platt
Attorney

Inventor:
Paul V. Snyder.
by Leonard J. Platt
Attorney

ELECTRIC TOASTER CONSTRUCTION

ELECTRIC TOASTER CONSTRUCTION

BACKGROUND OF THE INVENTION

This invention relates to an electric toaster housing and support construction, and more particularly, to an integrally formed toaster housing shell which includes flange means for assembling toaster components to each other.

As is well known in the electric toaster art, outer metal housing shells including bread receiving slots and other metal parts forming sidewalls and end walls of the toaster have been assembled to each other and to supporting members in a number of different ways. These parts have taken various shapes and have been constructed and assembled in a number of different arrangements of subassemblies and assemblies. In these constructions, screws, rivets and other securing means have been required for connecting the parts to each other. In addition, in these prior art constructions, a number of different assembly operations have been required for positioning the parts relative to each other and for securely connecting them to each other. It is particularly desirable to be able to form the components of a toaster so that they may be readily connected to each other in a minimum number of assembly movements, and it is also desirable that they be readily assembled to each other with a minimum amount of effort being required to line up the parts before they are secured.

SUMMARY OF THE INVENTION

It is the particular object of my invention to provide a unique toaster housing and support construction which may be readily manufactured which includes a minimum number of parts which may be readily positioned with respect to each other and securely connected to each other using a minimum number of securing devices.

In accordance with one of the aspects of this invention, an electric toaster includes a shell having two integrally formed sidewalls and a top wall. Conventionally bread receiving slots are located in the top wall. A depending flange is integrally formed with the top wall and inwardly extending guide flanges are integrally formed on each of the sidewalls. The inwardly extending guide flanges on the sidewalls are positioned inwardly of the depending flange. With this construction, an end panel may be quickly and readily connected to the toaster shell by simply inserting the upper wall portion of the panel beneath and inwardly from the depending flange on the top wall with the side wall portions of the panel positioned in close contact with the inwardly extending guide flanges of the side walls. By this arrangement, end panels may be readily connected to and securely held on a toaster shell between a top wall and sidewall flanges.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
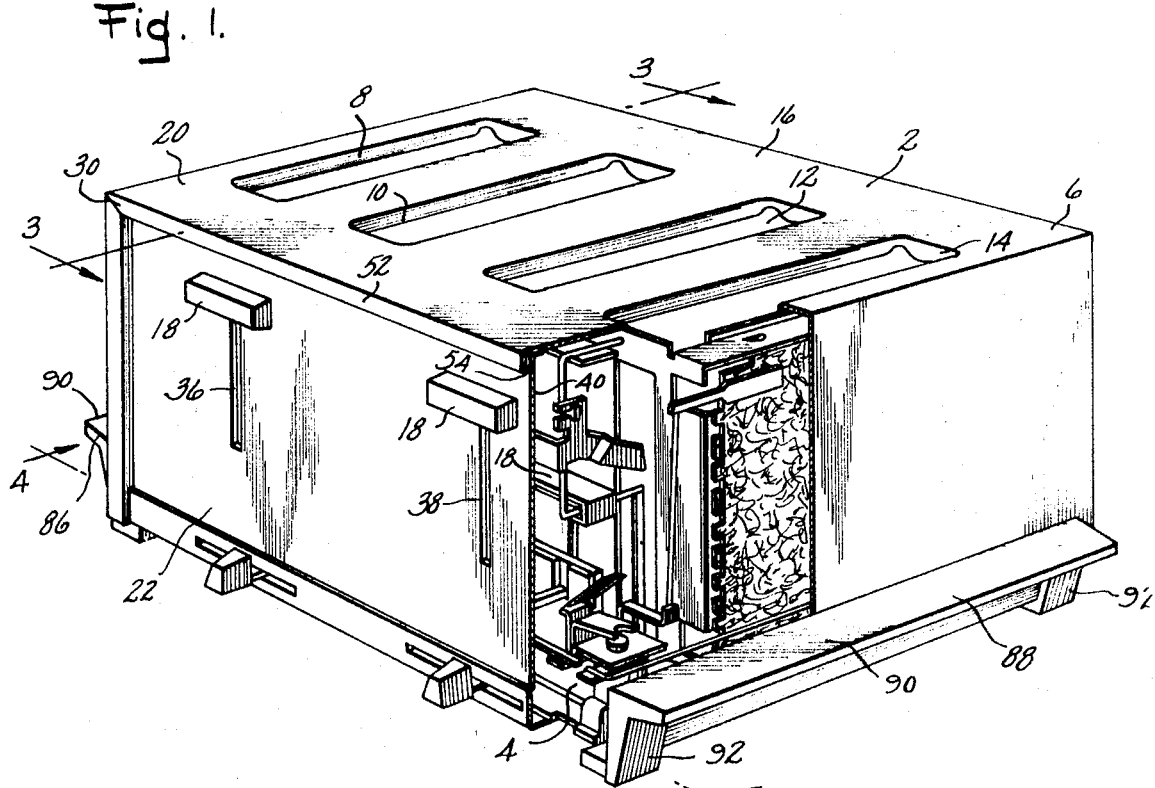
FIG. 1 is a perspective view of an electric toaster construction embodying the invention partly broken away to show details of construction.

Referring now to the drawing and first particularly to FIG. 1, there is shown an electric toaster 2 which includes an inner chassis 4 and an outer housing 6. Bread receiving slots 8, 10, 12, and 14 are formed in a top wall 16 of the outer casing and toasting chambers are generally defined below the slots. Bread carriages 18 are movable vertically in the toasting chambers as is conventional in popup style toasters, and when it is desired to toast a slice of bread or other food, the carriage 18 is manually depressed from the position illustrated in FIG. 1.

Figure 2:
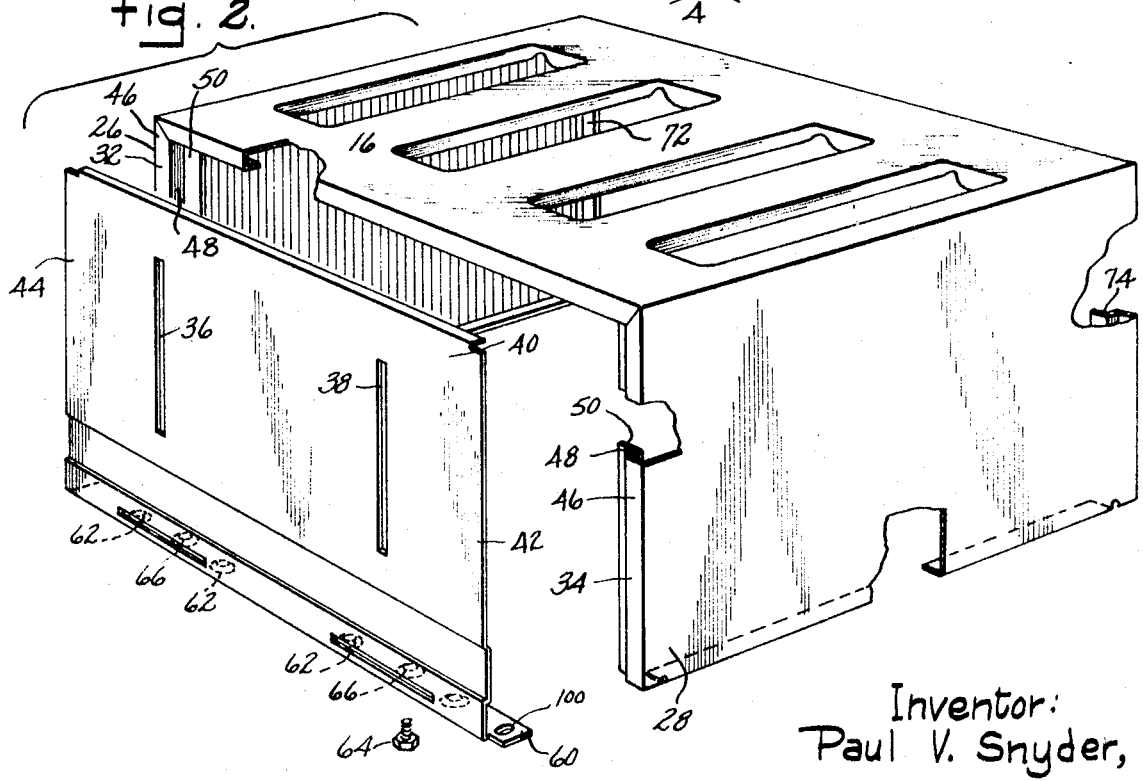
FIG. 2 is an exploded perspective view of a toaster shell and end panel in unattached positions.

According to my invention, a uniquely formed one-piece shell 20, and front and rear end panel members 22 and 24 are provided for forming the outer housing of the toaster. As shown in FIG. 2, the one-piece shell 20 includes the top wall 16 of the toaster which has the bread receiving slots 8, 10, 12, and 14 formed therein, and sidewalls 26 and 28 which are integrally formed with the top wall 16 of the shell member and extend downwardly from the top wall. A depending flange 30 also extends downwardly from the top wall for uniquely cooperating with inwardly flanges 32 and 34 which extend inwardly from the sidewalls 26 and 28, respectively, for uniquely holding the end panels 22 and 24.

Figure 3:
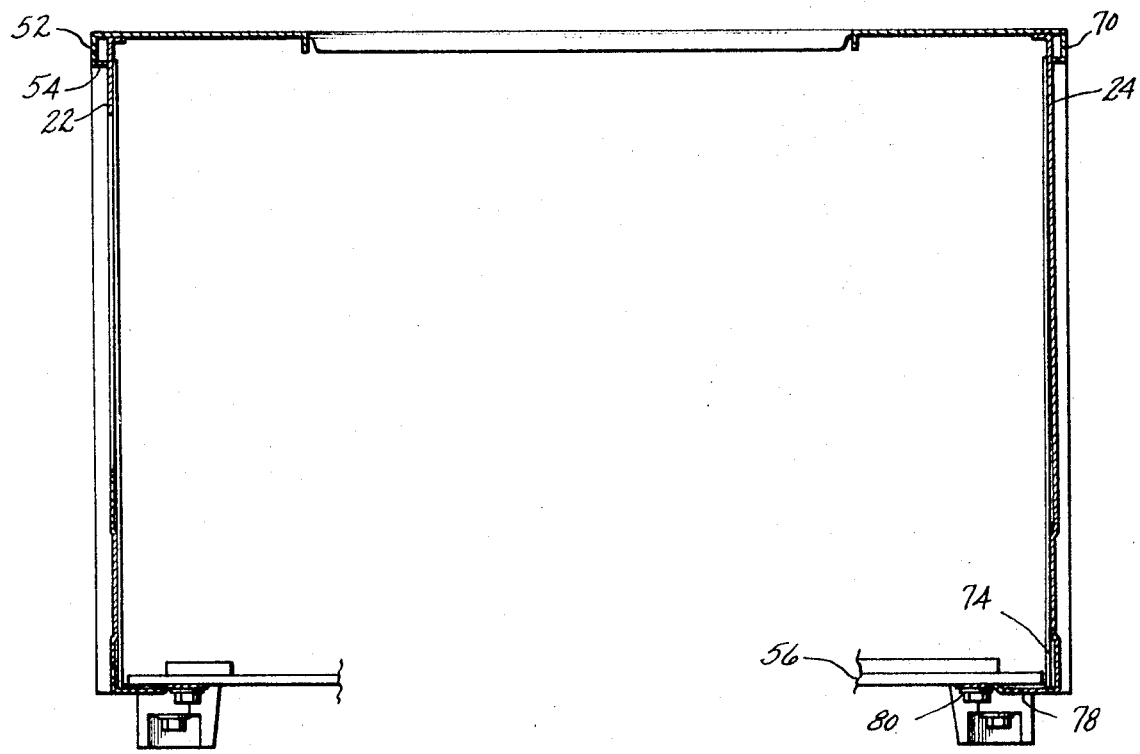
FIG. 3 is a cross-sectional view of the electric toaster construction taken substantially on the plane 3–3 of FIG. 1.

As shown more particularly in FIG. 2, the front end panel 22 is formed of a generally flat piece of sheet metal and it includes slots 36 and 38 for receiving an outwardly extending actuator lever of the toaster carriage 18 which is movable vertically in the toasting chambers. As shown in FIGS. 1 and 3, the front panel member 22 also includes an upper wall portion 40 which is uniquely positioned behind the downwardly extending flange 30 of the top wall, and two sidewall portions 42 and 44 which are positioned to rest against the inwardly extending flanges 32 and 34 which are integrally formed with the outer shell 20. With particular reference to FIG. 2, it can be appreciated that the inwardly extending flanges 32 and 34 include inwardly extending walls 46 which are arranged to be continuous and in the same plate as the depending wall 30, walls 48 which are arranged to be generally perpendicular to the inwardly extending walls 46 and inwardly extending walls 50 which are arranged to be generally parallel to but inwardly spaced from the walls 46. In addition, as shown in FIG. 1, depending wall 30 includes a wall portion 52 which is arranged to be contiguous with and in the same plane as walls 46 and a wall portion 54 which is arranged to be generally perpendicular to wall portion 52. With reference to FIG. 3, it can be seen that the generally perpendicular wall portion 54 extends inwardly toward wall portions 50 but is spaced from wall portions 50 by a distance substantially equal to the thickness of the front end panel member 22. Thus, the upper wall portion 40 of the front end panel member 24 may be conveniently and readily sandwiched between the end of wall 54 and wall portions 50.

A uniquely formed arrangement is also provided for connecting the bottom of the front and rear panel members 22 and 24 to the toaster. As illustrated more particularly in FIG. 4, the toaster includes a baseplate 56 for supporting the toaster chassis and other components of the toaster and, as illustrated, the plate includes a plurality of downwardly extending protruding bosses 58. Preferably, the baseplate 56 is cast from aluminum or other suitable material and the protruding bosses 58 are integrally formed on the baseplate during the casting operation. As shown in FIG. 2, the front end panel 22 of the toaster includes an inwardly extending bottom flange member 60 for uniquely connecting the panel to the toaster base plates 56 and for securely holding the baseplate and other components of the toaster in assembled position. As shown, a plurality of generally circular apertures 62 are provided in a bottom horizontal flange 60 of the front panel member 22. The circular apertures 62 are complimentary to the protruding bosses 58 which extend downwardly from the bottom wall of the toaster baseplate, and thus, when the end front panel 22 of the toaster is positioned on the shell 20 with the side edges 42 and 44 in contact with walls 50, the front panel 20 may be slid upwardly on the guide walls 50 until the protruding bosses 58 are received by the circular apertures 62, thereby confining the end panel from upward and sideward movement. The end panel 22 is so closely held by the integrally formed flanges 46, 50 and 52 and the protruding bosses 58 that only two screws 64 are required to complete the assembly. As shown, the screws 64 extend through apertures 66 formed in the flange 60 and apertures 68 formed in the baseplate 56.

As shown more particularly in FIGS. 2 and 3, the rear panel member 24 of the toaster is constructed in essentially the same manner as the front panel 22, and it may be securely held on the toaster by being positioned between depending flange 70 and inwardly extending flanges 72 and 74. The rear panel 24 also includes an inwardly extending, generally horizontal, bottom flange 78 which includes screw receiving apertures 80 for connecting the flange to bottom wall portions base plate 56.

Figure 4:
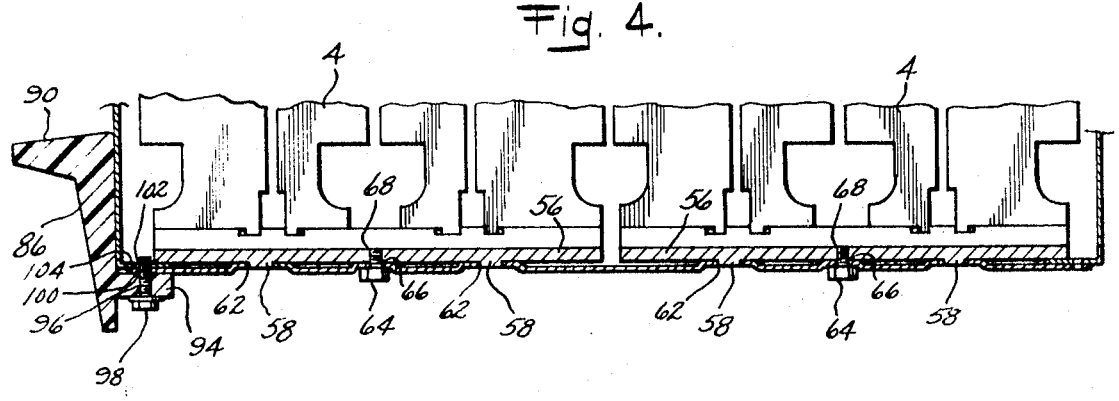
FIG. 4 is a cross-sectional view of the electric toaster construction taken substantially on the plane 4–4 of FIG. 1.

As shown more particularly in FIGS. 1 and 4, uniquely formed handle and support members 86 and 88 may be positioned on opposite sides of the toaster. The handle and support members may be integrally formed of plastic or other suitable material, and, as illustrated, each of the members includes a handle portion 90 and two depending legs 92 for supporting the electric toaster. Each of the legs also includes a generally horizontal wall portion 94 having a screw receiving aperture 96 formed therein for connecting the handle and support members to the electric toaster. As shown in FIG. 4, screws 98 extend through apertures 96 in the horizontal wall through a screw receiving aperture 100 formed in the bottom horizontal flange of the front panel, and through a screw receiving aperture 102 formed in a flange 104 which is integrally formed with the sidewall 26 of the shell. By this arrangement, the handle support 86, the front panel 22, and the sidewall 26 of the shell are securely held to each other.

With the component parts of the toaster constructed in the manner described above, the electric toaster may be readily assembled by simply positioning the unique shell member 20 on a conveyor belt or work bench with the bread slots 8, 10, 12 and 14 resting on the work bench and the sidewalls 26 and 28 of the shell extending upwardly. Then the toaster chassis is inverted and positioned on the top wall of the shell so that the toasting chambers of the chassis are in line with the bread receiving slots. The front panel member 22 is then slid into position with the actuating levers of the toaster carriage extending through slots 36 and 38. It can be appreciated that the front panel member 22 may be very quickly placed in its appropriate position by simply sliding the top wall portion 40 of the front panel on flange portions 50 and moving it upwardly until the top wall portion 40 is located beneath depending flanges 52 and 54. Then the bottom portion of the front panel is moved upwardly until the apertures 62 become in line with the protuberances 58 which are formed on the bottom wall of the base plate. Screws 64 complete the assembly of the front panel to the shell and the baseplate of the toaster chassis. In like manner, the rear panel 24 is slid on the guide walls 50 of the toaster shell and is connected to the toaster chassis.

The handle supports 86 are then quickly assembled to the sidewalls and end walls of the toaster by means of screws 98.

From the foregoing description, it will be appreciated that my unique simplified electric toaster construction is formed of a minimum number of parts and a minimum number of separate connecting means and yet the parts are securely held and rigidly connected to each other. Moreover, with this assembly the front and rear end panel members 22 and 24 are uniquely sandwiched between depending flange 52 which prevents outward movement of the end panels, and flange portions 50 which prevents inward movement of end panel. Flange members 48 which extend generally perpendicular to the horizontal flange parts 46, prevent lateral movement of the end panels. Thus, an exceedingly simple, yet sturdily constructed, electric toaster housing has been achieved.

What I claim:

1. An electric toaster construction comprising:
  a. a toaster shell including two integrally formed sidewalls and a top wall having a plurality of bread receiving slots formed therein:
  b. a depending flange integrally formed with side top wall:
  c. inwardly extending guide flanges integrally formed on each of said sidewalls, said inwardly extending guide flanges being positioned inwardly from said depending flange; and
  d. an end panel including a generally flat end wall and a bottom inwardly extending generally horizontal flange, said panel also including an upper vertical wall portion and two sidewall portions, said end wall, said upper vertical wall portion and said two sidewall portions being in the same plane as each other, said panel being connected to said toaster shell with its upper wall portion being positioned inwardly from said depending flange and outwardly from said inwardly extending guide flanges, and the sidewall portions of said panel being positioned in close contact with said inwardly extending guide flanges so that said end panel is securely held on said toaster between said depending flange and said inwardly extending guide flanges.

2. An electric toaster construction as defined in claim 1 wherein a toaster chassis having a generally flat bottom wall is positioned within said toaster shell, and the generally horizontal bottom flange of said end panel is secured to the bottom wall of said toaster chassis.

3. An electric toaster construction as defined in claim 2 including:
  a. an integrally formed handle and support member, said handle and support member having an inwardly extending generally horizontal bottom wall portion having a screw receiving aperture formed therein;
  b. a screw receiving aperture formed in an inwardly extending generally horizontal flange of said sidewall; and
  c. a screw receiving aperture formed in the horizontal flange of said end panel whereby a screw may conveniently extend through the aperture formed in the bottom wall of said handle and support the screw receiving aperture in the generally horizontal flange of said end panel and the screw receiving aperture in the generally horizontal wall of said sidewall.

4. An electric toaster construction as defined in claim 2 wherein said toaster chassis bottom wall includes a plurality of downwardly extending protruding bosses integrally formed therewith and the generally horizontal flange of the end panel includes a plurality of generally circular apertures corresponding to said protruding bosses whereby said end panel may be conveniently connected to said toaster by positioning the top portion of said end panel behind said depending flange and in front of said inwardly extending guide flanges and by inserting the protruding bosses within the circular apertures formed in said bottom horizontal flange.